June 19, 1962 W. N. POUNDSTONE 3,039,596
BELT CONVEYOR
Filed Jan. 6, 1959 6 Sheets-Sheet 4

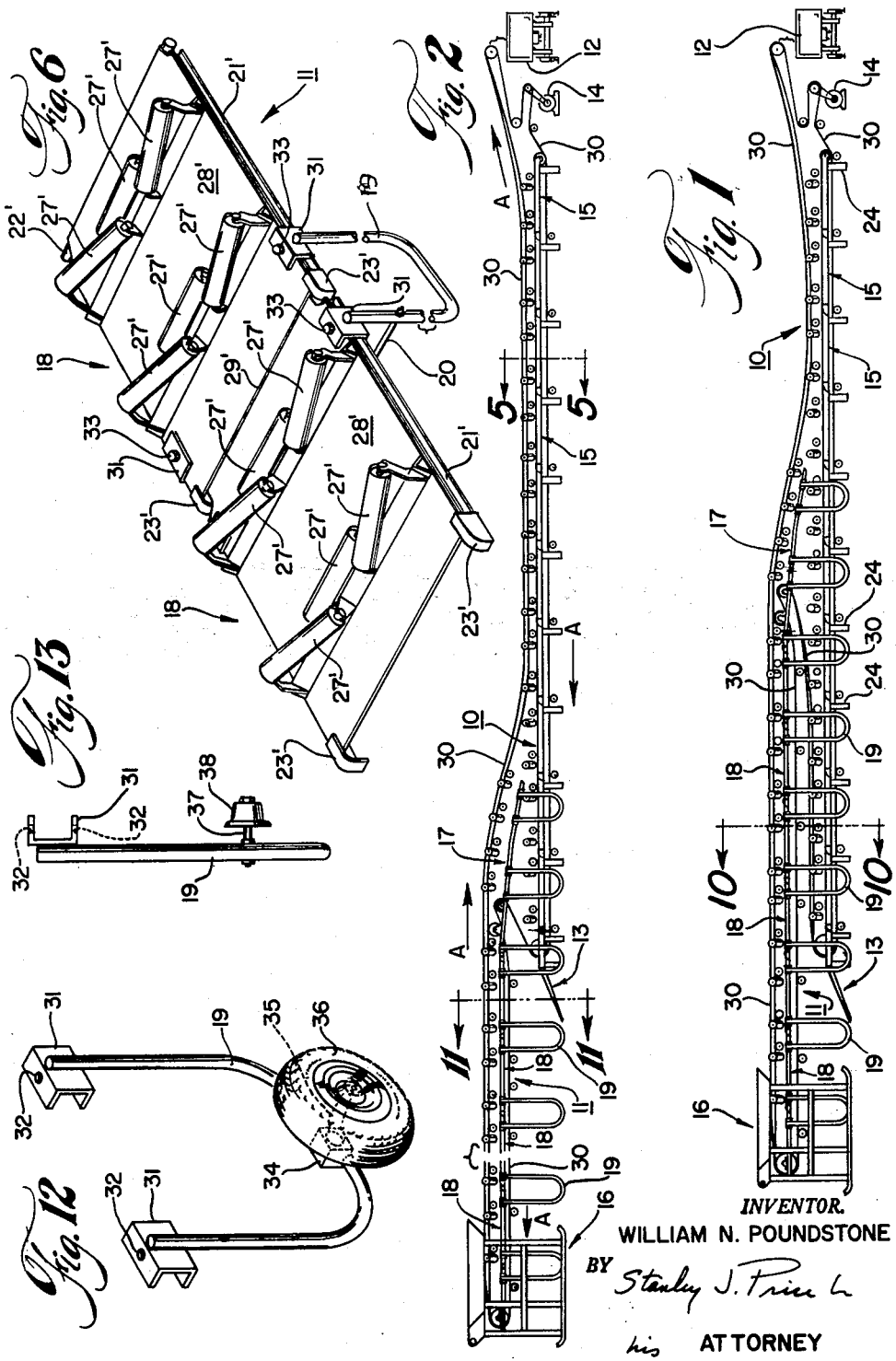
June 19, 1962 — W. N. POUNDSTONE — 3,039,596
BELT CONVEYOR
Filed Jan. 6, 1959 — 6 Sheets-Sheet 1
INVENTOR.
WILLIAM N. POUNDSTONE
BY Stanley J. Price
his ATTORNEY June 19, 1962  W. N. POUNDSTONE  3,039,596
BELT CONVEYOR
Filed Jan. 6, 1959  6 Sheets-Sheet 2
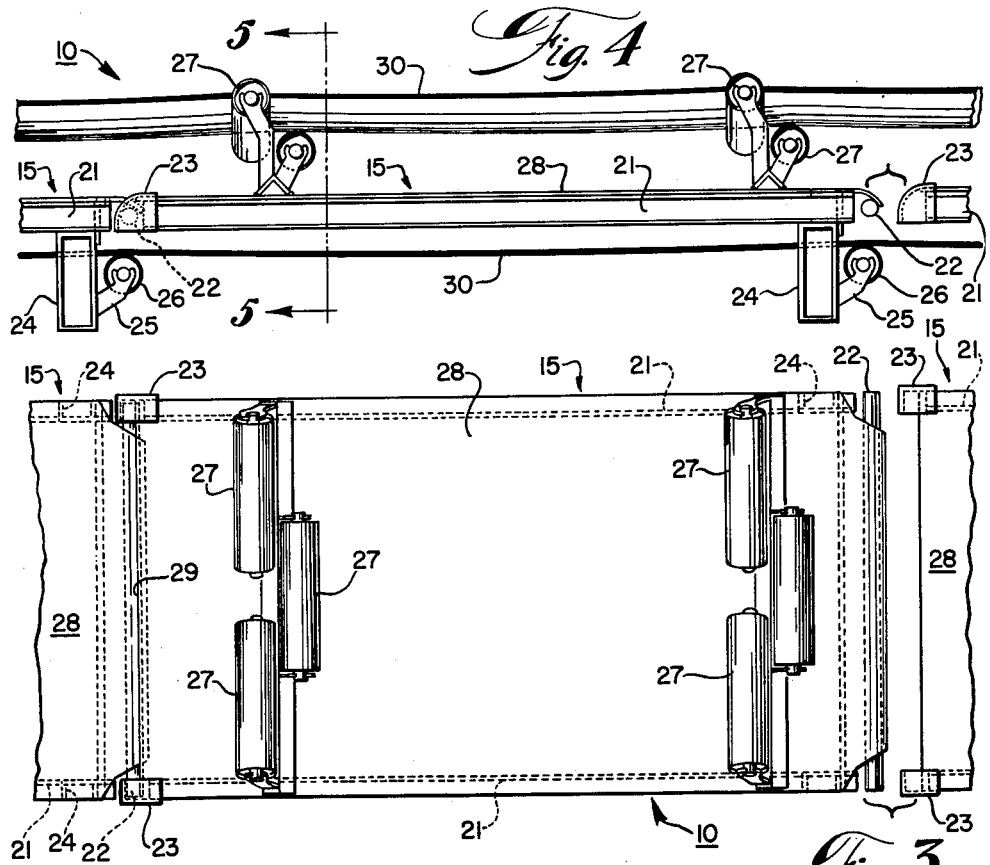
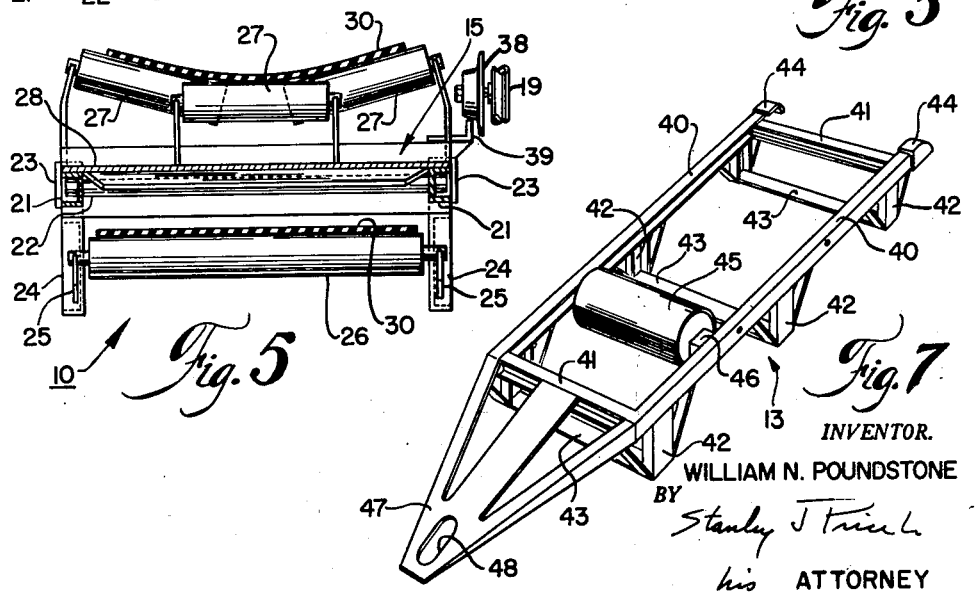
INVENTOR.
WILLIAM N. POUNDSTONE
BY Stanley J. Price
his ATTORNEY

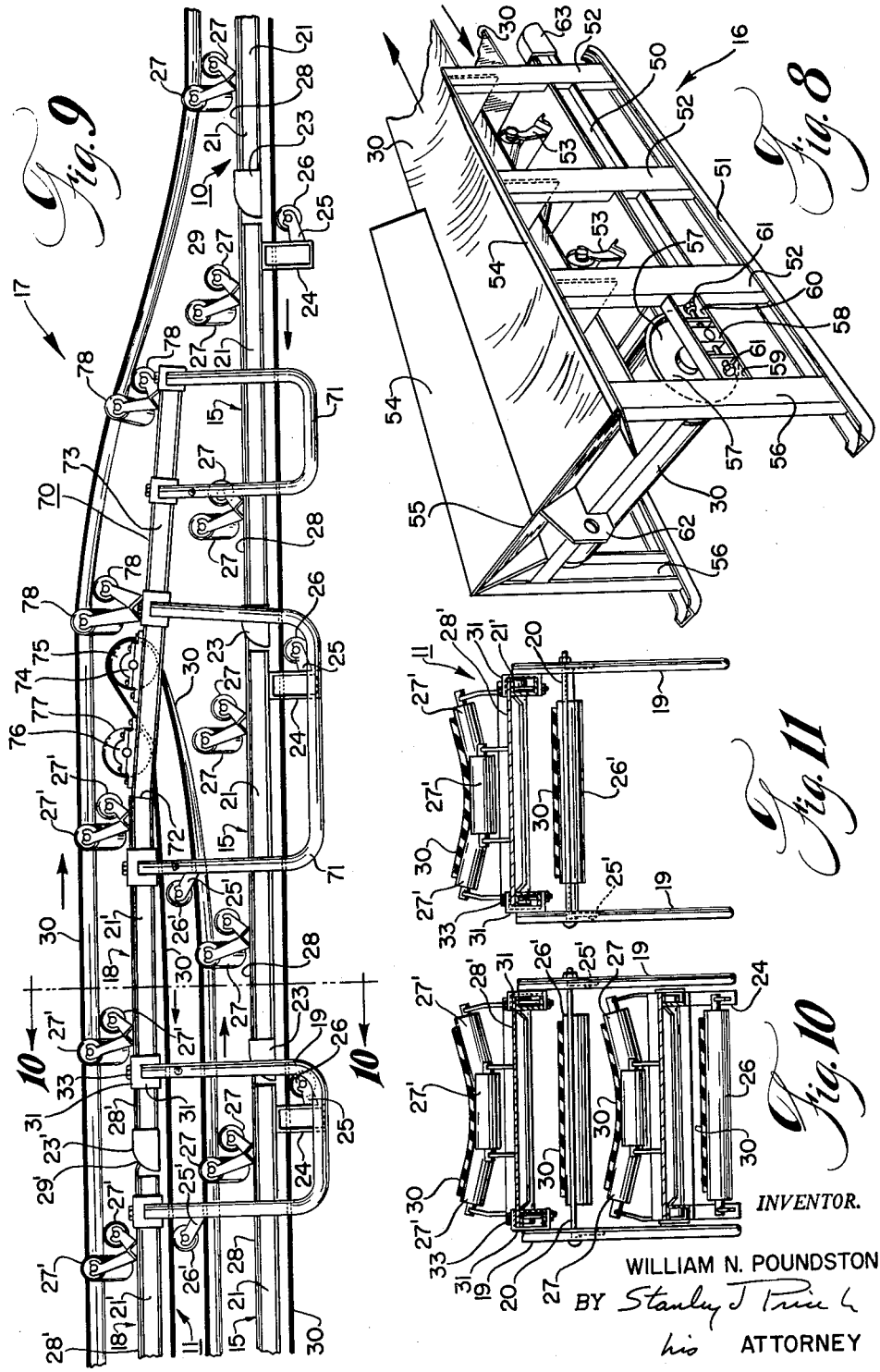

FIG. 14

INVENTOR.
WILLIAM N. POUNDSTONE
BY Stanley J Price
his ATTORNEY

June 19, 1962 W. N. POUNDSTONE 3,039,596
BELT CONVEYOR
Filed Jan. 6, 1959 6 Sheets-Sheet 5

INVENTOR.
WILLIAM N. POUNDSTONE
BY Stanley J Price
HIS ATTORNEY

June 19, 1962 W. N. POUNDSTONE 3,039,596
BELT CONVEYOR
Filed Jan. 6, 1959 6 Sheets-Sheet 6
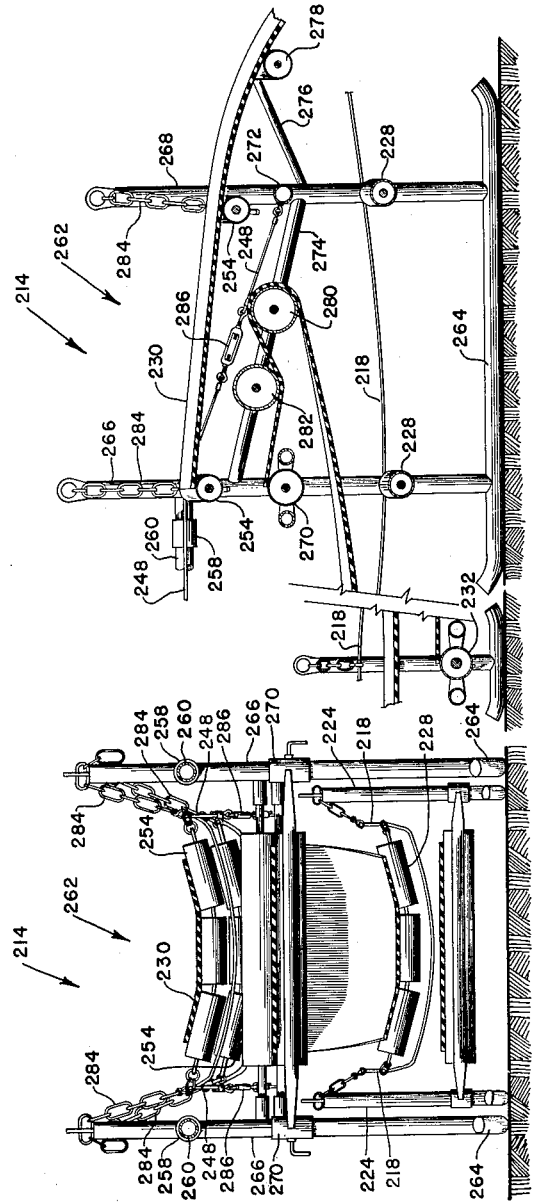
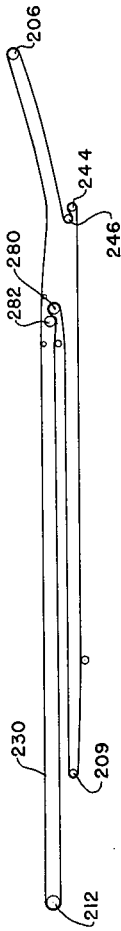
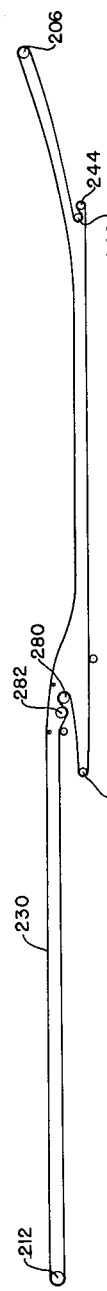
FIG. 18 FIG. 19 FIG. 20 FIG. 21 FIG. 22 FIG. 23
INVENTOR.
WILLIAM N. POUNDSTONE
BY
HIS ATTORNEY United States Patent Office 3,039,596
Patented June 19, 1962

3,039,596
BELT CONVEYOR
William N. Poundstone, Morgantown, W. Va., assignor to Consolidation Coal Company, Pittsburgh, Pa., a corporation of Pennsylvania
Filed Jan. 6, 1959, Ser. No. 785,144
20 Claims. (Cl. 198—139)

The present invention relates to belt conveyors and more particularly to an elongatable extensible straight line single belt conveyor.

This application is a continuation in part of my copending application Serial No. 519,362 filed July 1, 1955, now abandoned.

The use of straight line sectional belt conveyors in mines to convey coal from the working face has heretofore been limited for the reason that the extension of the conveyor into the working face, as the face advances, could not be readily accomplished. Every advance of the conveyor required a severence of the belt, installation of new pan sections, and the insertion or addition of belting by splicing. The existing straight line belt conveyors can be advanced only in increments of the pan section length at a cost of considerable manual labor and lost mining production during the belt advance operation.

It is the object of this invention to provide a straight line, single belt conveyor which can be continuously extended or retracted without stopping productive belt movement.

Another object of this invention is to provide an extensible straight line single belt conveyor which can be operated from a single drive unit.

It is another object of this invention to provide an extensible straight line single belt conveyor having flexible strand belt supporting means.

It is another object of this invention to provide an extensible straight line single belt conveyor which can be used directly in conjunction with the continuous mining machine whereby the mining machine itself supplies the traction for extending the conveyor at the face cutting rate.

Another object of this invention is to provide an extensible straight line belt conveyor which can be elongated or extended while maintaining the belt drive and discharge assembly in a fixed position.

A still further object of this invention is to provide an extensible belt conveyor in which the belting is adequately supported above and below the conveyor pan sections throughout its entire length.

In accordance with the present invention I have provided a belt conveyor system having a fixed belt supporting means and a movable belt supporting means. The movable belt supporting means is slidable above the fixed belt supporting means. My conveyor system includes a plurality of belt turnaround means that provide a means for the belt to be extended or retracted relative to the discharge terminus.

Extension of my new belt conveyor occurs through the sliding of the movable belt supporting means over the fixed belt supporting means. Elongation of my new conveyor belt occurs, if desired, through the addition of conventional pan sections or flexible strand belt supporting means to the fixed belt supporting means or to the movable belt supporting means.

The unique arrangement of the elements of my new conveyor system permits the use of conveyor belting which is fully supported at all points in the conveyor.

This invention consists of a new and improved conveyor system and of the combination and cooperation of the parts thereof which will be described more fully hereinafter and the novelty of which will be particularly pointed out and distinctly claimed.

In the accompanying drawings to be taken as part of the specification, there is clearly and fully illustrated two embodiments of this invention in which drawings:

FIGURE 1 is a view in side elevation of one embodiment of my new belt conveyor system in a retracted position.

FIGURE 2 is a view in side elevation of the embodiment illustrated in FIGURE 1 in an extended position.

FIGURE 3 is a plan view of the conventional pan sections used in the embodiment of my invention illustrated in FIGURES 1 and 2.

FIGURE 4 is view in side elevation of the conveyor pan section illustrated in FIGURE 3.

FIGURE 5 is a sectional view of the conveyor pan section taken along the line 5—5 of FIGURE 4.

FIGURE 6 is a perspective view of two pan sections modified for use in the embodiment of my invention illustrated in FIGURES 1 and 2.

FIGURE 7 is a perspective view of two pan sections around unit employed with the fixed belt supporting means illustrated in FIGURES 1 and 2.

FIGURE 8 is a perspective view of the loading tailpiece illustrated in FIGURES 1 and 2.

FIGURE 9 is a view in side elevation of an intermediate belt turnaround means forming a part of the belt conveyor system illustrated in FIGURES 1 and 2.

FIGURE 10 is a view in top section of the conveyor system taken along the line 10—10 of FIGURE 9.

FIGURE 11 is a view in cross section of the belt conveyor system taken along the line 11—11 of FIGURE 2.

FIGURE 12 is an enlarged perspective view of a modified pan section support.

FIGURE 13 is a view in section of a different modified pan section support element.

FIGURE 14 is a view in cross section of a typical conveyor belt discharge end structure having a belt turnaround means and belt driving means.

FIGURE 18 is an enlarged sectional view in front elevation taken along the lines 18—18 in FIGURE 17 and illustrating the fixed belt supporting means and the movable belt supporting means of the embodiment illustrated in FIGURES 15 and 16.

FIGURES 19 and 20 are enlarged views in side elevation of the belt turnaround means that is secured to an end portion of the fixed belt supporting means of the embodiment illustrated in FIGURES 15 and 16.

FIGURE 21 illustrates the telescopic arrangement of the rods which maintain the flexible strand supporting means in spaced relation to each other.

FIGURES 22 and 23 are schematic views of my conveyor system in its extended and retracted positions.

Figure 15:
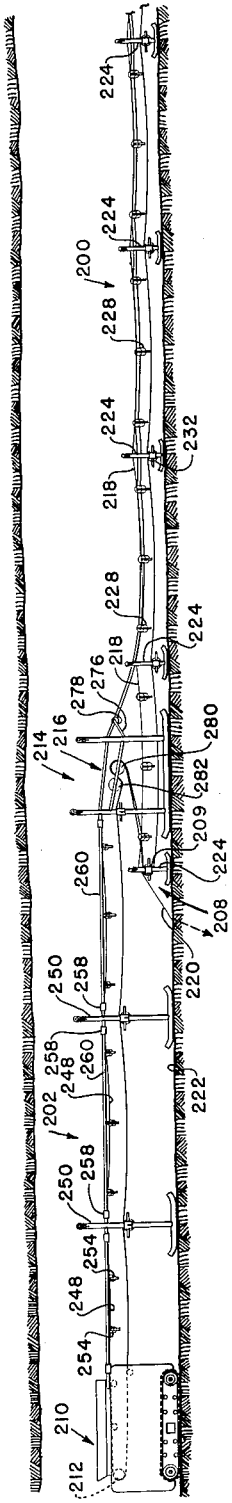
FIGURES 15 and 16 illustrate in side elevation another embodiment of my conveyor system in an extended position.

Throughout the description of the first embodiment, the fixed supporting means will be called the immobile ground train and the movable belt supporting means will be called the elevated movable train. It should be understood that these terms are intended to describe the fixed and movable sections of my conveyor systems.

The embodiment of my new conveyor illustrated in side elevation in FIGURE 1 in its retracted position and in FIGURE 2 in its extended position comprises essentially a fixed belt supporting means or immoble ground train 10 of aligned pan sections. A cooperating movable belt supporting means or elevated movable train 11 of aligned pan sections overlaps the ground train 10. The ground train 10 extends from a belt discharge point, where solids are discharged into a mine car, to a ground belt turnaround unit 13. A belt driving mechanism, indicated by the numeral 14, is associated with the discharge end of the conveyor system for producing belt movement. Conventional conveyor pan sections 15 are suitably interlocked in alignment between the discharge point and the ground belt turnaround unit 13. The pan sections 15 have troughed conveyor reach supports or, as defined in the first embodiment, belt supports and return reach idler rollers or, as defined in the first embodiment, guides to support the return reach of the conveyor belt.

The movable belt supporting means or elevated mobile train 11 includes a plurality of pan sections that are in alignment with the fixed belt supporting means or ground train 10 from a belt loading point, where a movable loading tailpiece 16 is provided, to an intermediate belt turnaround unit 17. The intermediate belt turnaround unit 17 is mounted above and out of contact with the ground train 10. The conveyor pan sections of the elevated mobile train have troughed idler rollers which support the conveying reach and idler rollers which support the return reach. As previously stated, in the first embodiment the troughed idler rollers which support the conveying reach are defined as belt supports and the return idlers are defined as belt guides. The conveyor pan sections are mounted upon vertically depending supports 19 which maintain the last named pan sections in proper vertical spaced relation with the fixed ground train 10.

The entire elevated movable train 11, comprising the tailpiece 16, the elevated pan sections 18 and the intermediate belt turnaround unit 17, is slidable as an integral assembly longitudinally collinearly with the ground train 10 whereby the conveyor system of the present invention may be extended from the ground belt turnaround unit 13 for a distance substantially equal to the length of the elevated train 11.

A single strand of conveyor belting 30 is laced through the conveyor system from the driving mechanism 14 of the horizontal guides beneath the ground train 10, through the ground belt turnaround unit 13, over the troughed supports at the forward end of the ground train 10, through the intermediate movable belt turnaround unit 17, over the horizontal belting guides beneath the movable train 11, through the loading tailpiece 16, over the troughed belt support above the movable train 11, over the intermediate movable belt turnaround unit 17, over the troughed belt supports at the discharge end of the ground train 10, around the roller 109 (FIGURE 14) of the belt discharging means, back to the belt driving mechanism 14.

The single strand of conveyor belting 30 functionally includes a conveying reach and a return reach. By conveying reach I mean that portion of the conveyor belting that is arranged to receive and transport the load from the loading tailpiece to the discharge terminus. By return reach I mean that portion of the belting that is beneath the conveying reach and completes the endless loop arrangement of the conveyor belting.

In my conveyor system illustrated in FIGURES 1 and 2 the conveying reach extends from the loading terminus 16 to the discharge means. The return reach completes the endless strand of conveyor belting 30 and extends rearwardly from the discharge terminus and is laced around the belt turnaround unit 13, then extends forwardly toward the discharge terminus and again reverses direction around the belt turnaround unit 17 and extends rearwardly toward the loading tailpiece 16. It should be noted when my conveyor mechanism is in a retracted position a section of the return reach is supported by the troughed conveyor idlers of the fixed belt supporting means. When my conveyor system is in an extended position on the portion of the return reach which overlapped the fixed belt supporting means and reversed direction toward the discharge terminus is now added to the conveying reach to provide an elongated conveyor mechanism.

The extension of my new conveyor occurs through the sliding of the movable belt supporting means or elevated train 11 over the fixed belt supporting means or ground train 10. Elongation of the embodiment of my new conveyor illustrated in FIGURES 1 and 2 occurs through the addition of conventional pan sections to the ground train 10 or modified pan sections to the elevated train 11 or both.

Belt Pan Sections

Conventional conveyor belt pan sections, illustrated in FIGURES 3, 4 and 5, will now be described briefly. Each pan section comprises a generally rectangular frame formed from lateral channel sections 21 and suitable cross bracing structure (not shown). A circular cross section bar or pipe 22 joins the lateral channel sections 21 at one end. Cap members 23 are provided at the other end of the lateral channel sections 21 for engaging the ends of circular cross section bars 22 from adjacent pan sections for releasable engagement of a plurality of pan sections in alignment to form a conveyor train. A vertically depending leg member 24 is bolted to each of the lateral channel sections 21 at one end to elevate the pan section above the ground. A journal 25 is provided on each leg member for receiving an axle of a freely rotatable horizontal belting guide roller 26. Troughed belt supporting rollers 27 of any suitable design are provided above the channel sections 21. If desired, a thin sheet of metal 28 may be bolted across the upper surface of the rectangular frame to prevent spillage onto the return belt run supported by the horizontal belting guide 26.

The modified pan sections 18 employed in the movable train 11 are illustrated in perspective in FIGURE 6 and also in FIGURE 11 which is a cross sectional view of the train 11 taken along the line 11—11 of FIGURE 2. Two pan sections 18, 18 are shown in FIGURE 6 in an interlocked engagement, elevated by means of a vertically depending U-shaped support 19 which spans the interlocking juncture 29. The function of the vertical support 19 is (a) to hold the elevated pan sections 18, 18, spanned by the support 19, in rigid coplanar relation, (b) to elevate the entire movable train 11 above and out of contact with the ground train 10 to permit slidable overlapping of the two trains and (c) to permit ready movement of the elevated train 11 by providing a slidable ground contact therefor. A transverse tie-rod 20 joins opposed supports 19 for rigidity. In all other respects the elevated pan sections correspond to and are interchangeable with the ground train pan sections illustrated in FIGURES 3, 4 and 5. Prime numerals identify elements of the elevated train corresponding to elements associated with the corresponding numerals of the ground train.

The U-shaped supports 19 are provided with a channel section 31 on each vertical member for overlapping top and bottom of the lateral channel section 21' of the pan sections used in the movable train 11. Bolt holes 32 are provided in the parallel sides of the channel section 31 in alignment with corresponding bolt holes through the parallel sides of the lateral channel section 21'. A bolt 33 passing vertically through the aligned bolt holes 32 and the bolt holes of the channel section 21' is provided to secure the channel sections 31 to the movable pan sections 18.

The vertical arms of the vertical support 19 must be of sufficient length to maintain the movable train 11 in a plane entirely above the top of the ground train 10. By employing a skid as shown in the support 19 of FIGURE 6, the entire movable train can be supported by the floor of the mine. However, it is preferred, to reduce friction in the movement of the movable train 11, that the movable train 11 be supported on wheels.

As shown in FIGURE 12, an axle mounting block 34 can be provided on the horizontal portion of each U-shaped support 19 for receiving an axle 35 of a freely rotatable rubber tired wheel 36. The axle 35 and wheel 36 are on the opposite sides of the U-shaped support 19 from the channel sections 31 to avoid interference with the ground train 10.

Alternatively, as shown in FIGURE 13, each of the U-shaped supports 19 may be supplied on its inner side along one vertical arm thereof with a perpendicular axle 37 for mounting a freely rotatable beveled wheel 38 which can roll along the side channel sections 21 of the ground train 10. This embodiment is further illustrated fragmentarily in FIGURE 5 wherein the beveled wheel 38 of the U-shaped support 19 is shown in rolling engagement upon an angle section rail 39 which may be provided on the pan sections used in the ground train 10. When U-shaped supports of the type shown in FIGURE 13 are employed, the horizontal skid portion is spaced above the floor of the mine so long as the beveled wheel 38 is in rolling engagement with a lateral channel section 21 of the ground train 10. As the belt conveyor is extended forwardly, the beveled wheels 38 roll forwardly and downwardly along a tapered, converging forward ramp of the ground belt turnaround unit 13 to permit the horizontal skid portion of the U-shaped supports to engage the floor of the mine and provide the entire support for that portion of the movable train 11 between the ground belt turnaround unit 13 and the loading tailpiece 16.

A plurality of the modified pan sections 18 illustrated in FIGURE 6 is provided in interlocked alignment in any desired length up to 400 feet and more. These interlocked, aligned modified pan sections 18, together with a movable loading tailpiece 16 interlocked at one end and an intermediate belt turnaround unit 17 interlocked at the other end, comprise the movable train 11.

*Ground Belt Turnaround Unit*

The ground belt turnaround unit 13 of FIGURES 1 and 2 is comprised of a generally rectangular frame elevated above the floor of the mine, engageable at one end with the forward pan section of the ground train 10, and containing a belt turnaround roller for diverting conveyor belting 30 from the horizontal belting guides beneath the ground train 10 to the troughed belt supports above the forward end of the ground train 10. The ground belt turnaround unit 13 will be described in detail by reference to FIGURE 7 which is an enlarged perspective view thereof. Parallel inwardly opening channel sections 40 and transverse channel sections 41 comprise the generally rectangular frame of the ground belt turnaround unit 13. A plurality of short leg members 42 are mounted beneath the side channel members 40 to elevate the ground belt turnaround unit 13 above the floor of the mine. Transverse braces 43 between the leg members 42 provide additional support. Cap members 44 are provided at the discharge end for interlocking engagement with a corresponding transverse circular cross section rod of the last pan section in the immobile ground train 10 of pan sections. A belt turnaround roller 45, having a width greater than that of the conveyor belt, is journaled at each end for free rotation in rectangular journal blocks 46 which are longitudinally slidable within the channel sections 40. Independent tightening means such as a winch and cable (not shown) are provided for sliding each of the journal blocks 46 along the channel section 40 to obtain the desired belt tension when a new section of belt is installed, and for belt alignment. An inclined and converging tapered ramp 47 is provided at the forward end to direct the vertical U-shaped supports 19 of the movable train 11 to each side of the ground belt turnaround unit 13. This is of especial importance when vertical U-shaped supports 19 of the type shown in FIGURE 13 are employed. A tractor hitch 48 is provided in the ramp extension 47 to permit towing of the ground belt turnaround unit 13 toward the face during a belt elongation movement as will be described hereinafter.

*Loading Tailpiece*

As shown in FIGURES 1 and 2 the loading tailpiece 16, engaged in alignment with the movable belt 11, is the forward end of my conveyor system. The loading tailpiece 16 comprises means for directing the loading of my conveyor belt and also roller means for turning conveyor belting from the horizontal belting guides beneath the movable train 11 to the troughed belt supports above the movable train 11.

The loading tailpiece 13 will be described in detail by reference to FIGURE 8 which is an enlarged perspective view thereof. A generally rectangular frame 50 is mounted horizontally above flat skids 51 by means of vertical supports 52. Cap members 63 are provided at the discharge end of the frame 50 for interlocking engagement with the forwardmost pan section 18 of the movable train 11. A series of troughed belt supports 53 is mounted above the frame 50. Upwardly and outwardly flared lateral deflector plates 54 are mounted on the vertical supports 52 above the level of the troughed belt support rollers 53. An upwardly and outwardly flared end deflector plate 55 joins the lateral deflector plates 54 at the forward end of the tailpiece 16 above forward vertical supports 56.

A belt turnaround roller 57 is rotatably mounted on journals 58 which are slidably movable within a horizontal groove 59 formed between two horizontal angle sections 60 at the level of the frame 50. Screw adjusting means 61 are provided for positioning the journals 58 within the groove 59 to permit adjustment of the alignment of an installed conveyor belt.

A tractor hitch 62 is provided at the forward end of the loading tailpiece 16 for towing the tailpiece and the elevated pan section train toward the mining face as face cutting proceeds.

If desired, the loading tailpiece 16 may be mounted on freely rotatable wheels instead of the skids 51.

*Intermediate Belt Turnaround Unit*

As shown in FIGURES 1 and 2, the movable intermediate belt turnaround 17 comprising the discharge end of the movable train 11 is mounted collinearly above and out of contact with the ground train 10. Its function is (a) to divert conveyor belting 30 from the troughed belt supports of the loading end of the ground train 10 to the horizontal belt guides beneath the movable train 11; and (b) to transfer conveyor belting 30 from the troughed belt supports above the movable train 11 to the troughed belt supports above the discharge end of the ground train 10.

The intermediate belt turnaround unit 17 will be described in detail by reference to FIGURE 9 which is an enlarged view in side elevation. The intermediate belt turnaround unit comprises a generally rectangular frame 70 mounted above and out of contact with the ground train 10 on lateral vertically depending skids 71 and engaged at its forward end with the last pan section of the discharge end of the movable train 11 at a juncture 72. The frame 70 comprises lateral side members 73 and transverse supports (not shown). A journal 74 is provided within the frame 70 at each side for supporting a freely rotatable belt roller 75. An additional journal 76 is mounted on the frame 73 forwardly of the journal 74 for supporting a belt idler roller 77 which serves to prevent whipping action in the conveyor belt 30. Mounted above the frame 70 is a plurality of troughed belt supporting rollers 78 which maintain the upper run of the belt 30 above and out of contact with the belt roller 75. If desired, wheels may be provided on the vertical supports 71 for increased ease of movement.

*Belt Discharge End Structure*

The belt discharge end structure, shown schematically at the right hand end of FIGURES 1 and 2 is illustrated in detail in FIGURE 14. As shown in FIGURE 14 the structure includes a sloping rectangular frame 100 comprising a pair of lateral panel sections 101 and generally horizontal cross members. The frame 100 has troughed belt rollers 102 on its upper surface and corresponds to the frame of conventional belt conveyor pan sections. Upright supporting structures such as channel sections 103 and 104 are connected to a base member 105 preferably mounted above ground level 106 by means of depending legs 107. Belt rollers 108 for supporting and guiding uploaded conveyor belting 117 are provided below the base member 105.

A conventional conveyor belt turnaround roller 109 or belt turnaround means 109 is rotatably mounted at the elevated lowered end of the frame 100. A driven conveyor belt roller 110 is rotatably mounted beneath the frame 100. An additional conveyor belt roller 111 also is rotatably mounted beneath the frame 100. A motor 112 is provided beneath the frame 100 to provide rotary movement on a shaft 115 through a gear reducer 114 to turn the drive roller 110, for example, by means of a drive belt 115 and pulley 116. The entire structure of FIGURE 14 is rigidly engageable with a train of conveyor pan sections such as pan section 118 and serves as the discharge terminus of the assembled belt system.

Conveyor belting 117 in a troughed shape moves from troughed belt roller 119 of the adjacent conveyor pan section 118 along the troughed belt rollers 102 to the conveyor belt turnaround pulley 109 which is positioned at the forward end of the frame 100 at a suitable height above ground level 106 to allow the interposition of a material receiving car such as mine car 12 shown in FIGURES 1 and 2 or a loading station for another conveyor system.

The conveyor belting 117 extends from the conveyor belt turnaround roller 109 to the driven belt roller 110 where it is frictionally engaged upon the rotating outer surface thereof and maintained in linear motion. The conveyor 117 is turned over the additional conveyor belt roller 111 and returned along the underside of the base member 105 and maintained out of contact with the ground by means of the belt rollers 108. From the belt rollers 108 the conveyor belting 117 is transferred to the belting guide rollers 120 beneath the adjacent belt conveyor pan section 118.

*Assembly*

Having now described the component parts of the embodiment of my new belt conveyor illustrated in FIGURES 1 through 14, its assembly will be particularly described with reference to FIGURES 1 and 2 and FIGURES 5, 10 and 11. To install my new conveyor belt, discharge and driving means of any suitable type are provided at the belt discharge point where the belt contents may be discharged into a mine car 12, for example, as shown in FIGURES 1 and 2. If desired, my new conveyor belt may discharge onto another conveyor belt system instead of the mine car 12. Thereupon a plurality of conventional conveyor belt pan sections as shown in FIGURES 3, 4 and 5, are interlocked in alignment for any desired distance along a straight passageway up to 1200 feet and more. A ground belt turnaround unit as shown in FIGURE 7 is provided at the forward end of the ground train 10 of pan sections. Thereupon an intermediate belt turnaround unit 17 as shown in FIGURE 9 is positioned above the ground train 10 with its vertical supports 71 straddling the ground train 10. Modified conveyor belt pan sections 18 as shown in FIGURES 6 and 11 are positioned and interlocked above the ground train 10 with the vertical supports 19 straddling the ground train 10. A sufficient number of modified pan sections 18 is provided to assure the desired length of extensibility. Extensibility up to 400 feet and more can be attained. The forwardmost modified pan section 18 should extend just forwardly of the ground belt turnaround unit 13.

A loading tailpiece 16 as shown in FIGURE 8 is interlocked at the forward end of the last modified pan section of the movable train 11.

Conveyor belting 30 is laced through my conveyor from the driving mechanism 14 at the belt discharge point over horizontal belting guides under the ground train 10, through the ground belt turnaround unit 13, over the troughed belt supports above the ground train 10, through the intermediate belt turnaround unit 17, over the horizontal belt guides of the movable train 11, through the loading tailpiece 16, over the troughed belt supports of the elevated train 11, over the troughed belt supports of the intermediate belt turnaround unit 17, and over the troughed belt supports of the ground train 10 to the discharge point.

An enlarged cross section view of my conveyor belt taken along the line 5—5 of FIGURE 2 is shown in detail in FIGURE 5 to illustrate the manner in which the belt 30 is supported between the belt discharge point and the intermediate movable belt turnaround unit. An enlarged cross section view of my conveyor taken along the line 10—10 of FIGURE 1 is shown in FIGURE 10 to illustrate the manner in which the belting is supported at its overlapped central portion between the intermediate movable belt turnaround unit and the ground belt turnaround unit. An enlarged cross section view of my conveyor belt taken along the line 11—11 of FIGURE 2 is shown in FIGURE 11 to illustrate the manner in which the conveyor belting is supported between the ground belt turnaround unit and the belt loading point.

It is seen from FIGURE 10 that in the overlapping portion of my conveyor system, the movable train 11 is supported entirely above and out of contact with the ground train 10.

*Extensibility*

With the belt conveyor system in operation, the drive mechanism 14 causes the belt to move in the direction indicated by the arrows A in FIGURE 2. The loading tailpiece 16 is hitched to the back of an advancing continuous mining machine, for example, through the tractor hitch 62 shown in FIGURE 8. As the continuous mining machine advances in cutting operation, the loading tailpiece 16, the modified pan sections 18 and the intermediate belt turnaround unit 17 which together comprise the movable elevated train 11 are pulled as an integral unit to follow the cutting advance. The loading elements of the continuous mining machine discharge freshly dislodged minerals onto the loading tailpiece 16 for transportation along the upper run of the belt 30 to the belt discharge point. Without further adjustment the entire conveyor system can be used for continuous conveying of solid materials to any distance determined by the length of the elevated movable train 11.

When the intermediate turnaround unit 17 has been extended to the ground pan section 15 adjacent the ground belt turnaround unit 13, additional pan sections and belting must be added to the conveyor for further extensibility. My extensible conveyor is readily elongatable for this purpose as will be described now.

*Elongation*

When the conveyor belt has been fully extended as shown in FIGURE 2, elongation can be accomplished by the addition of pan sections and additional belting. The loading tailpiece 16 is disconnected from its source of tractive power and retracted to the ground belt turnaround unit 13 as shown in FIGURE 1. This retraction can be accomplished by pushing the loading tailpiece 16 away from the face while the empty belt 30 is moving. Also retraction can be accomplished by means of a winch and cable positioned on the discharge side of the ground belt turnaround unit 13. A convenient method for effecting retraction of the movable train 11 is to clamp the conveyor belt 30 in fixed relation to the movable train 11 (for example, at one of the troughed idler rollers) and thereupon operating the belt in the usual direction to permit the belt movement itself to retract the entire movable train 11.

When the loading tailpiece 16 has been retracted to the ground belt turnaround unit 13, the belting is broken at an existing splice, the ground turnaround unit 13 is disengaged from its adjacent pan section 15 and advanced to any desired distance. The tractor hitch 48 (FIGURE 7) may be used for towing the ground turnaround unit 13. Additional pan sections 15 are then inserted into the ground train 10 between the ground turnaround unit 13 and its previous adjacent pan section 15. If desired, additional pan sections 18 with U-shaped upright supports 19 may be inserted into the elevated train 11 at the same time to increase the extensibility of the system. When the desired added length has been installed, sufficient additional belting is spliced in place to accommodate the added length and belt tension is restored as previously described.

The elevated train 11 is then advanced to the desired loading point by towing of the loading trailpiece 16 and conveying operations may be commenced and continued until the intermediate belt turnaround unit 17 is extended to the new, advanced position of the ground belt turnaround unit 13.

The conveyor system of the present invention permits straight line extensibility up to the length of the elevated train 11 without requiring manual labor and lost production needed for belt move-up in existing conveyor systems. The conveyor can be extended continuously or may be advanced in increments of any desired lengths without loss of its solids transportation function, i.e., solids can be moved towards the discharge end of the conveyor system without regard to whether the conveyor is stationary, extending or retracting. In some circumstances it may be desirable to provide a hydraulically operated winch and cable on the rear of a continuous mining machine used in conjunction with my conveyor for providing independent incremental extension of the conveyor as the mining machine advances during face cutting operations, thereby avoiding a continuous dissipation of a portion of the total tractive power which the mining machine develops.

The convenience of my conveyor is apparent from its use of conventional pan sections over the substantial bulk of its length. The pan sections employed in the ground train 10 require no modificaiton whatsoever. Similarly the pan sections employed in the elevated train 11 require no modification whatsoever beyond the on-site installation of the U-shaped upright supports 19. Thus the substantial bulk of necessary equipment may be redeployed for conventional belt conveyor use at any time. The elevated train 11 may be pulled directly by a continuous mining machine, or may be hauled by an operating loading machine or shuttle car or similar self-powered mining machine when used in mines employing "conventional" mining practices.

Alternatively the extensibility of my conveyor system may be provided by installing self-contained tractive power on the loading tailpiece 16. Another possible alternative is to provide portable tractive power in the form of a winch and cable for towing the tailpiece 16 forwardly in increments. This last-mentioned procedure is desirable when my new conveyor system is used in the mining of rooms extending off the haulageway where the conveyor is positioned. Here belt movements are required only when new rooms are entered. By combining my new belt conveyor with a laterally flexible train of articulated, interconnected conveying devices which can follow continuous mining machines in recovering minerals from rooms lateral to the straight passageway and which can discharge onto my new conveyor belt system, the entire mining operation may be made continuous.

*Embodiment Illustrated in FIGURES 15 Through 23*

Figure 16:
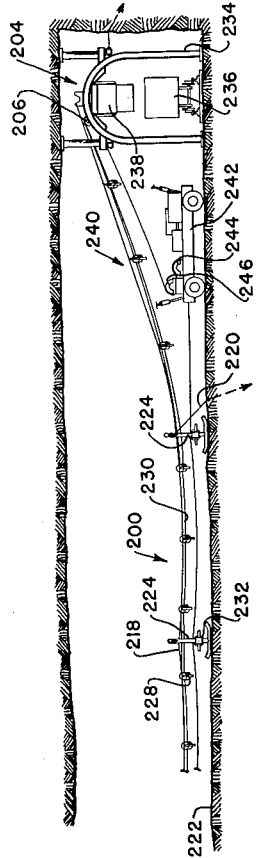
Figure 17:
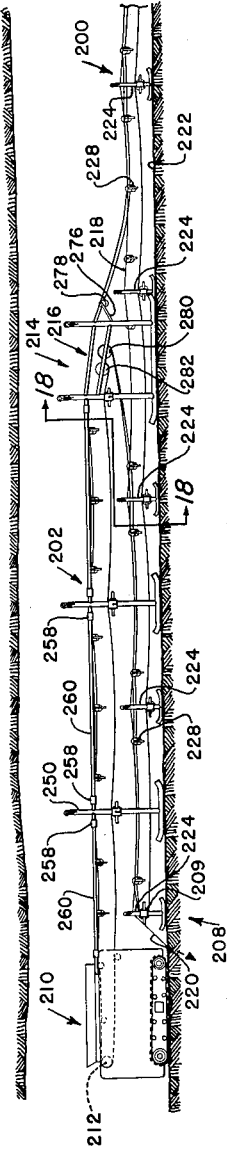
FIGURE 17 is a fragmentary view in side elevation of the embodiment illustrated in FIGURES 15 and 16 showing my new belt conveyor system in a retracted position.

Referring to the drawings, and particularly to FIGURES 15 and 16, there is illustrated another embodiment of my invention which includes a fixed belt supporting means generally designated by the numeral 200 and a movable belt supporting means generally designated by the numeral 202. The fixed belt supporting means 200 has a material discharge end portion 204 which includes a belt turnaround means 206 and another end portion 208 (FIGURE 15) which includes a belt turnaround means 209. The movable belt supporting means 202 has a loading terminus or loading end portion 210 which includes a belt turnaround means 212 and another end portion 214 which includes a belt turnaround means 216. As in the first embodiment the movable belt supporting means 202 is positioned above the fixed belt supporting means and is movable collinearly relative thereto. FIGURE 17 illustrates the conveyor mechanism in the retracted position with the fixed belt supporting means end portion 208 adjacent the loading terminus 210. FIGURE 15 illustrates the conveyor mechanism in its extended position wherein the belting of the return reach formerly supported by the troughed idler rollers of the fixed belt supporting means has now been added to the conveying reach.

Referring in detail to the various components of my conveyor system, the fixed belt supporting means 200 includes a pair of flexible wire ropes 218 extending in spaced parallel relation to each other along the haulageway and maintained in longitudinal tension by a securing means generally designated by the numeral 220 in the mine floor 222. The flexible strands 218 are supported along their length by stands or supports 224. Depending from the stands 224 are chains 226 which connect the strands 218 to the vertical portions of the stands 224.

Between the stands 224 there are secured to the flexible strands a plurality of troughed idler rollers 228 which are arranged to support the conveying reach of the conveyor belt 230. The arrangement of the flexible troughed idler rollers 228 and the flexible strands 218 provides an improved means for supporting the conveyor belt 230 in that changes in load on the conveying reach are absorbed by both lateral and longitudinal movement of the flexible strands 218. The stands 224 each include a return idler roller 232 extending laterally beneath the conveying reach of the belting 230. The return idlers 232 are arranged to support the portion of the return reach extending below the conveying reach.

The stands 224 are more completely described in my copending application Serial No. 690,684.

The discharge terminus end portion of the fixed belt supporting means 200 includes an arch structure 234 which elevates the belt turnaround means 206 and the conveyor belting 230 above the mine car 236. A conventional fly gate chute 238 is positioned above the mine car 236 and is arranged to receive the material discharged from the conveying reach of the endless belt 230 as it passes around the belt turnaround means 206. The arch type discharge terminus is more fully described in my copending application Serial No. 698,273.

Both the belting 230 and the flexible strands 218 have an inclined portion 240 adjacent the discharge terminus end portion 204. Beneath the inclined portion 240 there is positioned a portable belt driving mechanism 242 which includes a pair of rollers 244 and 246 around which the belting 230 is laced. The rollers 244 and 246 are driven in a similar manner as is illustrated in FIGURE 14.

The fixed belt supporting means 200 remains in a fixed position in the haulageway and may be considered relatively permanent. If it is desired to elongate the fixed belt supporting means 200, additional sections of flexible strands 218 may be secured to the end portion 208 and additional strand supports 224 may be positioned to support the additional lengths of flexible strands 218 and troughed idlers 228 positioned between the strand supports 224.

The movable belt supporting means 202 includes a track mounted self-propelled material receiving terminus 210. The material receiving terminus 210 has belt turnaround roller 212 around which is laced the endless belt 230. The loading terminus 210 is similar in many respects to the loading terminus illustrated in FIGURE 8 and includes a means (not shown) to propel the terminus relative to the fixed belt supporting means 200.

Extending from the loading terminus 210 are a pair of flexible strands 248 which are secured to the end portions 214 (later described). The flexible strands 248 are supported intermediate their end portions by a plurality of stands 250 which in many respects are similar to the stands 224. The stands 250, however, have depending chains 252 which support the laterally extending troughed idlers 254 well above the fixed supporting means 220. The return idlers 256 are secured to the stands 250 and also are positioned above the fixed belt supporting means 200. In its assembled position there is a compressive force exerted on the movable belt supporting means 202 that would limit tension on the flexible strands 248. The stands 250 each have couplings 258 extending horizontally therefrom into which there extends horizontal rods 260 which maintain the stands 250 in proper spaced relation to each other.

The other end portion 214 of movable belt supporting means 202 includes a belt turnaround structure generally designated by the numeral 262 illustrated in detail in FIGURES 18, 19 and 20. The belt turnaround structure 262 functions not only to reverse the direction of the return reach of belt 230 but also provides a securing means for the flexible strands 248 and a means to support the inclined section of the conveying reach formed by the vertical spacing between the fixed belt supporting means 200 and the movable belt supporting means 202.

The belt turnaround structure 262 includes a pair of longitudinally extending skids or ground contacting members 264 which are maintained in spaced lateral relation to each other. Extending upwardly from the skids 264 is a first pair of vertical members 266 and a second pair of vertical members 268. The vertical members 266 are maintained in spaced lateral relation to each other by means of the return idler assembly 270. The vertical members 268 are maintained in spaced lateral relation by means of the rod 272. The vertical supports 266 and 268 are maintained in longitudinal spaced relation by means of the pair of cross members 274. Extending outwardly from the vertical members 268 are brackets 276 to which there is secured the troughed idler roller 278. The turnaround roller 280 is operatively secured to the pair of cross members 274 and extends therebetween. A second roller 282 is similarly secured to the cross member 274 in spaced relation with turnaround roller 280.

The vertical supports 266 and 268 each have depending therefrom a chain 284 to which there is secured a troughed idler 254. The chains 284 are so adjusted in relation to the vertical supports or posts 266 that they form an inclined support for the conveying reach of the belting 230. The troughed idler 278 which is secured to the brackets 276 and extends forwardly therefrom is positioned below the troughed idlers 254 supported by the posts 268 so that additional support is given the conveying reach through the inclined portion heretofore described.

The flexible strands 248 are secured to the laterally extending rod 272 between the supports 268 and includes a turnbuckle 286 which is used to adjust tension on the strands 248. The strands 248 which are secured to the depending chain 284 are arranged to extend substantially parallel and in the same plane with the horizontal rods 260.

The embodiment of my invention illustrated in FIGURES 15 through 21 may be extended in a manner similar to the embodiment illustrated in FIGURES 1 and 2. To clearly point out the relative positions of the belting 230 when my conveyor system is in an extended and retracted position, schematic FIGURES 22 and 23 are included to illustrate the belting 230 in an extended and retracted position.

Referring to FIGURE 22 the turnaround roller 212 secured to the loading terminus 210 is illustrated. The end pulley or turnaround pulley 206 secured to the discharge terminus is also schematically illustrated. The conveying reach portion of my conveyor system is illustrated by the top line of belting extending between the pulley 212 and the pulley 206. The drive pulleys 244 and 246 are schematically illustrated together with the first turnaround pulley 209 secured to the other end portion of the fixed belt supporting means. The pulleys or rollers 280 and 282 illustrated in detail in FIGURE 20 are also schematically set forth. The return reach of my conveyor system extends from discharge pulley 206 around the drive pulleys 244 and 246, around end pulley 209 of the fixed belt supporting means, thence around the turnaround pulley 280 of the movable belt supporting means to the head pulley 212 secured to the loading terminus.

FIGURE 23 illustrated my conveyor system in its retracted position. The relative position of belt turnaround pulleys 280 and 209 illustrate the amount of belting available to be added to the conveying reach as the conveyor is extended. In its retracted position the portion of the return reach between belt turnaround pulleys 209 and 280 is supported by the troughed idler rollers of the fixed belt supporting means which, when the belt is in its extended position, support the conveying reach.

According to the provisions of the patent statutes, I have explained the principle, preferred construction and mode of operation of my invention and have described what I consider to represent my best embodiments. However, I desire to have it understood that, within the scope of the appended claims, the invention may be practiced otherwise than as specifically illustrated and described.

I claim:

1. In an extensible belt conveyor having a conveying reach and a return reach the combination comprising an elongated fixed belt supporting means and a separate elongated longitudinally movable belt supporting means, said movable belt supporting means positioned above and in overlapping relation with said fixed belt supporting means, both of said belt supporting means including means to support said conveying reach and said return reach, said movable belt supporting means having an elevated end section arranged to overlap an end section of said fixed belt supporting means, first and second separate belt turnaround means associated respectively with each of the non-overlapping ends of said belt supporting means, said conveying reach extending directly between said first and second belt turnaround means and supported to convey material between said first and second belt turnaround means, third belt turnaround means associated with the overlapped end of said fixed belt supporting means, and said elevated end section having a separate fourth belt turnaround means arranged above said fixed belt supporting means for receiving belting supported by said fixed belt supporting means.

2. In an extensible belt conveyor having a conveying reach and a return reach the combination comprising an elongated fixed belt supporting means and a separate elongated longitudinally movable belt supporting means, said movable belt supporting means positioned above and in overlapping relation with said fixed belt supporting means, both of said belt supporting means including means to support said conveying reach and said return reach, said movable belt supporting means having an elevated end section arranged to overlap an end section of said fixed belt supporting means, separate belt turnaround means associated respectively with each of the non-overlapping ends of said belt supporting means and with the overlapping end of said fixed belt supporting means, said conveying reach extending directly between said separate belt turnaround means associated respectively with each of the non-overlapping ends of said belt supporting means, said elevated end section including means to support the inclined portion of said conveying reach bridging the vertical spacing between said fixed belt supporting means and said movable belt supporting means, and said elevated end section having belt turnaround means arranged beneath said last named means and above said fixed belt supporting means for receiving belting supported by said fixed belt supporting means.

3. In an extensible endless belt conveyor having a conveying reach and a return reach, the combination comprising a fixed belt supporting means having a material discharge end portion and another end portion, a movable belt supporting means having a material receiving end portion and another end portion, said fixed belt supporting means having a first belt turnaround means adjacent said material discharge end portion and a second belt turnaround means adjacent said other end portion, said movable belt supporting means having a third belt turnaround means adjacent said material receiving end portion and a fourth belt turnaround means adjacent said other end portion, both of said belt supporting means including means to support said conveying reach and said return reach, said movable belt supporting means positioned above and in overlapping relation with said fixed belt supporting means with said fourth belt turnaround means between said first and second belt turnaround means, said endless belt conveying reach extending directly from said third belt turnaround means to said first belt turnaround means, said return reach extending serially from said first belt turnaround means around said second belt turnaround means then around said fourth belt turnaround means to said third belt turnaround means, said movable belt supporting means constructed and arranged to move relative to said fixed belt supporting means to thereby vary the position of said fourth belt turnaround means relative to said first and second belt turnaround means to thereby vary the length of said conveying reach, and means to drive said conveyor belt.

4. In an extensible endless belt conveyor having a conveying reach and a return reach, the combination comprising a fixed belt supporting means having a material discharge end portion and another end portion, a movable belt supporting means having a material receiving end portion and another end portion, said fixed belt supporting means having a first belt turnaround means adjacent said material discharge end portion and a second belt turnaround means adjacent said other end portion, said movable belt supporting means having a third belt turnaround means adjacent said material receiving end portion and a fourth belt turnaround means adjacent said other end portion, said movable belt supporting means other end portion positioned in elevated overlapping relation above said fixed belt supporting means with said fourth belt turnaround means between said first and second belt turnaround means, said endless belt conveying reach extending directly from said third belt turnaround means to said first belt turnaround means, said return reach extending serially from said first belt turnaround means around said second belt turnaround means then around said fourth belt turnaround means to said third belt turnaround means, said movable belt supporting means other end portion having means to support the inclined portion of said conveying reach bridging the vertical spacing between said fixed belt supporting means and said movable belt supporting means, said movable belt supporting means constructed and arranged to move relative to said fixed belt supporting means to thereby vary the position of said fourth belt turnaround means relative to said first and second belt turnaround means to thereby vary the length of said conveying reach, and means to drive said conveyor belt.

5. In an extensible belt conveyor having a conveying reach and a return reach the combination comprising an elongated fixed belt supporting means and a separate elongated longitudinally movable belt supporting means, said fixed belt supporting means including a pair of stationary laterally spaced flexible strands, a plurality of strand supports positioned in spaced relation along said spaced flexible strands, a plurality of belt supporting idlers spaced along said strands spanning said strands and suspended therefrom, said belt supporting idlers spaced from said strand supports, said movable belt supporting means positioned above and in overlapping relation with said fixed belt supporting means, said movable belt supporting means including means to support said conveying reach and said return reach, said movable belt supporting means having an elevated end section arranged to overlap an end section of said fixed belt supporting means, first and second separate belt turnaround means associated respectively with each of the non-overlapping ends of said belt supporting means, said conveying reach extending directly between said first and second turnaround means and supported to convey material between said first and second turnaround means, third belt turnaround means associated with the overlapped end of said fixed belt supporting means, and said elevated end section having fourth belt turnaround means arranged above said fixed belt supporting means for receiving belting supported by said belt supporting idlers of said fixed belt supporting means.

6. In an extensible belt conveyor having a conveying reach and a return reach the combination comprising an elongated fixed belt supporting means and a separate elongated longitudinally movable belt supporting means, said movable belt supporting means including a pair of laterally spaced flexible strands, a plurality of strand supports positioned in spaced relation to each other along said spaced flexible strands, means to maintain said strand supports in fixed spaced relation to each other, a plurality of belt supporting idlers spaced along said strands, spanning said strands, and suspended therefrom, said belt supporting idlers spaced from said strand supports, said fixed belt supporting means including means to support said conveying reach and said return reach, said movable belt supporting means having an elevated end section arranged to overlap and extend above an end section of said fixed belt supporting means, first and second separate belt turnaround means associated respectively with each of the non-overlapping ends of said belt supporting means, said conveying reach extending directly between said first and second turnaround means and supported to convey material between said first and second turnaround means, third belt turnaround means associated with the overlapped end of said fixed belt supporting means, said elevated end section including means to support the inclined portion of said conveying reach bridging the vertical spacing between said fixed belt supporting means and said movable belt supporting means, and said elevated end section having fourth belt turnaround means arranged beneath said last named means and above said fixed belt supporting means for receiving belting supported by said fixed belt supporting means.

7. In an extensible belt conveyor having a conveying reach and a return reach the combination comprising an elongated fixed belt supporting means and a separate elongated longitudinally movable belt supporting means, both said fixed belt supporting means and said movable belt supporting means including a pair of laterally spaced flexible strands, a plurality of strand supports positioned in spaced relation along said spaced flexible strands, a plurality of belt supporting idlers spaced along said strands spanning said strands and suspended therefrom, said belt supporting idlers spaced from said strand supports, said movable belt supporting means including means to maintain said strand supports in spaced relation to each other, said movable belt supporting means positioned above and in overlapping relation with said fixed belt supporting means, said movable belt supporting means having an elevated end section arranged to overlap an end section of said fixed belt supporting means, first and second separate belt turnaround means associated respectively with each of the non-overlapping ends of said belt supporting means, said conveying reach extending directly between said first and second turnaround means and supported to convey material between said first and second turnaround means, third belt turnaround means associated with the overlapped end of said fixed belt supporting means, and said elevated end section having a separate fourth belt turnaround means arranged above said fixed belt supporting means for receiving belting supported by said belt supporting idlers of said fixed belt supporting means.

8. In a belt conveyor, a fixed elongated frame and a longitudinally movable elongated frame in overlapping relation therewith, said frames having a plurality of belt supporting rollers on top and a plurality of belting guides below the top of each frame, said movable frame having an elevated end section arranged to overlap and extend above an end section of said fixed frame, separate belt turnaround means associated respectively with each of the non-overlapping ends of said frames and with the overlapped end section of said fixed frame, intermediate belt turnaround means secured at one end to said elevated end section above said fixed frame, said intermediate belt turnaround means having (1) belt supporting rollers arranged on top thereof to support a section of said conveying reach extending directly between the belt supporting rollers of said movable frame and said fixed frame, and (2) belt turnaround means arranged beneath said belt supporting rollers and above said fixed frame for receiving belting from said belt supporting rollers of said fixed frame and directing it to said belting guides of said movable frame, and means for driving a belt.

9. In a belt conveyor, a fixed elongated frame and a longitudinally movable elongated frame in overlapping relation therewith, said frames having a plurality of belt supporting rollers on top and a plurality of belting guides below the top of each frame, said movable frame having an elevated end section arranged to overlap and extend above an end section of said fixed frame, separate belt turnaround means associated respectively with each end of said fixed frame, intermediate belt turnaround means secured at one end to said elevated end section above said fixed frame, said intermediate belt turnaround means having (1) belt supporting rollers arranged on top thereof to support a section of said conveying reach extending directly between the belt supporting rollers of said movable frame and said fixed frame, and (2) belt turnaround means arranged beneath said belt supporting rollers and above said fixed frame for receiving belting from belt supporting rollers of said fixed frame and directing it to said belting guides of said movable frame, a belt loading means secured at one end to said movable frame at its inby end, said belt loading means having belt turnaround means and being longitudinally movable relative to said fixed frame, and means for driving a belt.

10. In a belt conveyor, a fixed elongated sectional frame being ground supported and a longitudinally movable elongated frame in overlapping relation therewith, said frames having a plurality of belt supporting rollers on top and a plurality of belting guides below the top of each frame, said movable frame having a plurality of ground engaging supports for elevating at least its end section in overlapping relation above an end section of said fixed frame, said ground engaging supports being spaced laterally of said fixed frame, separate belt turnaround means associated respectively with each of the non-overlapping ends of said frames and with the overlapped end section of said fixed frame, intermediate belt turnaround means secured at one end to said elevated end section above said fixed frame, said intermediate belt turnaround means having (1) belt supporting rollers arranged on top thereof to support a section of said conveying reach extending directly between the belt supporting rollers of said movable frame and said fixed frame, and (2) belt turnaround means arranged beneath said belt supporting rollers and above said fixed frame for receiving belting from said belt supporting rollers of said fixed frame and directing it to said belting guides of said movable frame, and means for driving a belt.

11. In a belt conveyor, a fixed elongated sectional frame and a longitudinally movable elongated frame in overlapping relation therewith, said frames having a plurality of belt supporting rollers on top and a plurality of belting guides below the top of each frame, said movable frame having a plurality of vertically depending ground engaging supports mounted laterally thereof to support said movable frame above and spaced apart from an overlapped end portion of said fixed frame, separate belt turnaround means associated respectively with each of the non-overlapping ends of said frames and with the overlapped end section of said fixed frame, intermediate belt turnaround means spaced above and apart from said fixed frame and secured at one end to the overlapping portion of said movable frame, said intermediate belt turnaround means having (1) belt supporting rollers arranged on top thereof to support a section of said conveying reach extending directly between the belt supporting rollers of said movable frame and said fixed frame, and (2) belt turnaround means arranged beneath said belt supporting rollers and above said fixed frame for receiving belting from said belt supporting rollers of said fixed frame and directing it to said belt guides of said movable frame, and means associated with the non-overlapped end of said fixed frame for driving a belt.

12. An elongatable, extensible straight line conveyor comprising an immobile ground train of a plurality of interlocked pan sections having troughed belting supports on top and belting guides beneath, said ground train being provided at its discharge end with belt driving and turnaround means, and being provided at its forward end with ground belt turnaround means, an elevated train of a plurality of interlocked pan sections having troughed belting supports on top and belting guides beneath and having laterally mounted vertical elevating supports spanning each connection between adjoining pan sections for supporting said elevated train above and in overlapping relation to said ground train, intermediate belt turnaround means comprising an elongated frame secured to the discharge end of said elevated train and slidable above and spaced apart from said ground train, a freely rotatable belt roller and troughed belting supports above said belt roller, a belt loading means provided at the forward end of said elevated train comprising a frame having a freely rotatable belt roller and ground engaging support means adapted to permit movement and a single band of flexible belting laced above said belting guides of said ground train, over said ground turnaround means, over said troughed belting supports at the forward end of said ground train, over said intermediate belt turnaround, over said belting guides of said elevated train, over said belt loading means, over said troughed belting supports of said elevated train, over said troughed belting supports of said intermediate belt turnaround means, and thereafter over said troughed belt supports at the discharge end of said ground train and over said belt drive and turnaround means to the place of beginning.

13. An elongatable, extensible straight line conveyor comprising an immobile ground train of a plurality of interlocked pan sections having troughed belting supports on top and belting guides beneath, said ground train being provided at its discharge end with belt driving and turnaround means, and being provided at its forward end with ground belt turnaround means, an elevated train of a plurality of interlocked pan sections having troughed belting supports on top and belting guides beneath and having laterally mounted vertical U-shaped supports with brackets on the upright elements thereof engageable each with one of two adjoining pan sections for supporting said elevated train above and in overlapping relation to said ground train, intermediate belt turnaround means comprising an elongated frame secured to the discharge end of said elevated train and slidable above and spaced apart from said ground train, a freely rotatable belt roller and troughed belting supports above said belt roller and laterally mounted elevating supports, belt loading means provided at the forward end of said elevated train comprising a frame having a freely rotatable belt roller and ground engaging support means adapted to permit movement, and a single band of flexible belting laced above said belting guides of said ground train, over said ground turnaround means, over said troughed belting supports at the forward end of said ground train, over said intermediate belt turnaround, over said belting guides of said elevated train, over said belt loading means, over said troughed belting supports of said elevated train, over said troughed belting supports of said intermediate belt turnaround means, and thereafter over said troughed belt supports at the discharge end of said ground train and over said belt drive and turnaround means to the place of beginning.

14. An elongatable, extensible straight line conveyor comprising an immobile ground train of a plurality of interlocked pan sections having troughed belting supports on top and belting guides beneath, said ground train being provided at its discharge end with belt driving and turnaround means, and being provided at its forward end with ground belt turnaround means comprising a freely rotatable roller, an elevated train of a plurality of interlocked pan sections having troughed belting supports on top and belting guides beneath and having laterally mounted vertical U-shaped supports spanning each connection beween adjoining pan sections, a wheel mounted for free rotation on each of said U-shaped supports for engaging the ground beneath said ground train thereby supporting said elevated train above, out of contact with and in overlapping relation to said ground train, intermediate belt turnaround means comprising an elongated frame secured to the discharge end of said elevated train and slidable above and spaced apart from said ground train, a freely rotatable belt roller, troughed belting supports above said belt roller and laterally mounted elevating supports, belt loading means provided at the forward end of said elevated train comprising a freely rotatable belt roller and ground engaging support means adapted to permit movement, and a single band of flexible belting laced above said belting guides of said ground train, over said ground turnaround means, over said troughed belting supports at the forward end of said ground train, over said intermediate belt turnaround, over said belting guides of said elevated train, over said belt loading means, over said troughed belting supports of said elevated train, over said troughed belting supports of said intermediate belt turnaround means, and thereafter over said troughed belt supports at the discharge end of said ground train and over said belt drive and turnaround means to the place of beginning.

15. An elongatable, extensible straight line conveyor comprising an immobile ground train of a plurality of interlocked pan sections having flat parallel sides and having troughed belting supports on top and belting guides beneath, said ground train being provided at its discharge end with belt driving and turnaround means, and being provided at its forward end with ground belt turnaround means comprising a frame having parallel sides collinear with those of said ground train, tapered converging rails extending forwardly from said frame, a freely rotatable belt roller mounted on an axis perpendicular to that of said ground train, an elevated train of a plurality of interlocked pan sections having troughed belting supports on top and belting guides beneath and having laterally mounted vertical U-shaped supports spanning each connection between adjoining pan sections, a beveled wheel rotatably mounted interiorly on each of said U-shaped supports for rolling along said flat parallel sides of interlocked pan sections in said ground train, thereby to support said elevated train above and in overlapping relation to said ground train, intermediate belt turnaround means comprising an elongated frame secured to the discharge end of said elevated train and slidable above and spaced apart from said ground trains, a freely rotatable belt roller, troughed belting supports above said belt roller, with a belt loading means provided at the forward end of said elevated train comprising a freely rotatable belt roller and support members vertically depending laterally of said frame to maintain said last mentioned belt roller above and out of contact with said troughed belting supports of said ground train and adapted to permit movement of said intermediate belt turnaround means relative to said ground train, and a single band of flexible belting laced above said belting guides of said ground train, over said ground turnaround means, over said troughed belting supports at the forward end of said ground train, over said intermediate belt turnaround, over said belting guides of said elevated train, over said belt loading means, over said troughed belting supports of said elevated train, over said troughed belting supports of said intermediate belt turnaround means, and thereafter over said troughed belt supports at the discharge end of said ground train and over said belt drive and turnaround means to the place of beginning.

16. An intermediate belt turnaround device for use in an elongatable, extensible belt conveyor including a fixed and a movable train of interlocked conveyor pan sections, said belt turnaround device comprising a generally rectangular frame having parallel sides, a forward end and a discharge end, vertical supports rigidly attached to said sides and depending downwardly to elevate said frame entirely above said fixed train of interlocked conveyor pan sections, low friction contact devices mounted on said supports to permit movement of said belt turnaround device in a direction parallel to said sides, a belt roller mounted for free rotation about a generally horizontal axis perpendicular to said sides, said belt roller being adapted to receive conveyor belting from beneath the forward end of said frame and to deliver conveyor belting beneath the forward end of said frame, a plurality of troughed belt supporting rollers forming a trough generally parallel to said sides entirely above and out of contact with said belt roller to guide belting directly from said belt turnaround device discharge end to said fixed train, and interlocking means at the forward end of said frame engageable with correlative interlocking means of said movable train of conveyor belt pan sections.

17. An intermediate belt turnaround device for use in an elongatable, extensible belt conveyor including a fixed and a movable train of interlocked conveyor pan sections, said belt turnaround device comprising a generally horizontal rectangular frame having parallel sides, a forward end and a discharge end, vertical supports rigidly attached to said sides and depending downwardly to elevate said frame entirely above said fixed train of interlocked conveyor pan sections, a freely rotatable wheel mounted on the outside of at least one of said vertical supports at the bottom thereof on each side of said belt turnaround device for supporting the entire belt turnaround device and permitting movement of said device in a direction parallel to said sides, a belt roller mounted for free rotation about an axis perpendicular to said sides, said belt roller being adapted to receive conveyor belting from beneath the forward end of said frame and to deliver conveyor belting beneath the forward end of said frame, a plurality of troughed belt supporting rollers forming a trough generally parallel to said sides entirely above and out of contact with said belt roller to guide belting directly from said belt turnaround device discharge end to said fixed train, and interlocking means at the forward end of said frame engageable with correlative interlocking means of said movable train of conveyor belt pan sections.

18. An intermediate belt turnaround device for use in an elongatable, extensible belt conveyer including a fixed and a movable train of interlocked conveyer pan sections, said belt turnaround device comprising a generally horizontal rectangular frame having parallel sides, a forward and a discharge end, vertical supports rigidly attached to said sides and depending downwardly to elevate said frame entirely above said fixed train of interlocked conveyer pan sections, at least one skid at the bottom of said vertical support on each side to support the entire belt turnaround device and permit movement of said belt turnaround device in a direction parallel to said sides, a belt roller mounted for free rotation about an axis perpendicular to said sides, said belt roller being adapted to receive conveyer belting from beneath the forward end of said frame and to deliver conveyer belting beneath the forward end of said frame, a plurality of troughed belt supporting rollers forming a trough generally parallel to said sides entirely above and out of contact with said belt roller to guide belting directly from said belt turnaround device discharge end to said fixed train, and interlocking means at the forward end of said frame engageable with correlative interlocking means of said movable train of conveyer belt pan sections.

19. An intermediate belt turnaround device for use in an elongatable, extensible belt conveyer including a fixed and a movable train of interlocked conveyer pan sections, said belt turnaround device comprising a generally horizontal rectangular frame having parallel sides, a forward end and a discharge end, vertical supports rigidly attached to said sides and depending downwardly to elevate said frame entirely above said fixed train of interlocked conveyer pan sections, at least one skid at the bottom of said vertical supports on each side to support the entire belt turnaround device and permit movement of said belt turnaround device in a direction parallel to said sides, a flanged, beveled wheel mounted on the inside of at least one of said vertical supports on each of said sides with the beveled edge thereof facing internally for engagement with the outer edge of said fixed train of conveyer pan section, a belt roller mounted for free rotation about an axis perpendicular to said sides, said belt roller being adapted to receive conveyer belting from beneath the forward end of said frame and to deliver conveyer belting beneath the forward end of said frame, a plurality of troughed belt supporting rollers forming a trough generally parallel to said sides entirely above and out of contact with said belt roller to guide belting directly from said belt turnaround device discharge end to said fixed train, and interlocking means at the forward end of said frame engageable with correlative interlocking means of said movable train of conveyer belt pan sections.

20. An intermediate belt turnaround device for use in an elongatable, extensible belt conveyer including a fixed and a movable train of interlocked conveyer pan sections, said belt turnaround device comprising a generally horizontal rectangular frame having parallel sides, a forward end and a discharge end, vertical supports rigidly attached to said sides and depending downwardly to elevate said frame entirely above said fixed train of interlocked conveyer pan sections, low friction contact devices mounted on said supports to permit movement of said belt turnaround device in a direction parallel to said sides, a belt roller mounted for free rotation about a generally horizontal axis perpendicular to said sides, a belt idler roller mounted forwardly of said belt roller for free rotation about an axis parallel to that of said belt roller, said belt roller and said belt idler roller being adapted to receive conveyer belting from beneath the forward end of said frame and to deliver conveyer belting beneath the forward end of said frame, a plurality of troughed belt supporting rollers forming a trough generally parallel to said sides entirely above and out of contact with said belt roller and said belt idler roller to guide belting directly from said belt turnaround device discharge end to said fixed train, and interlocking means at the forward end of said frame engageable with correlative interlocking means of said movable train of conveyer belt pan sections.

References Cited in the file of this patent
UNITED STATES PATENTS

| | | |
|---|---|---|
| 1,691,681 | Thomson | Nov. 13, 1928 |
| 1,999,932 | Hughes | Apr. 30, 1935 |
| 2,576,217 | Eggleston | Nov. 27, 1951 |
| 2,629,484 | Thomson | Feb. 24, 1953 |
| 2,773,257 | Craggs et al. | Dec. 4, 1956 |
| 2,880,849 | Craggs et al. | Apr. 7, 1959 |

UNITED STATES PATENT OFFICE
CERTIFICATE OF CORRECTION

Patent No. 3,039,596     June 19, 1962

William N. Poundstone

It is hereby certified that error appears in the above numbered patent requiring correction and that the said Letters Patent should read as corrected below.

Column 2, lines 21 and 22, for "two pan sections around" read -- the belt turnaround --.

Signed and sealed this 16th day of October 1962.

(SEAL)
Attest:

ERNEST W. SWIDER
Attesting Officer

DAVID L. LADD
Commissioner of Patents